(12) United States Patent
Bayer

(10) Patent No.: US 6,921,986 B2
(45) Date of Patent: Jul. 26, 2005

(54) HORIZONTAL OMNI-DIRECTIONAL WINDMILL

(75) Inventor: Wolfgang Bayer, Dundas (CA)

(73) Assignee: Creative Wind Power Solutions Inc., Prince Edward Island (CA)

( * ) Notice: Subject to any disclaimer, the term of this patent is extended or adjusted under 35 U.S.C. 154(b) by 192 days.

(21) Appl. No.: 10/615,944

(22) Filed: Jul. 10, 2003

(65) Prior Publication Data
US 2005/0006904 A1 Jan. 13, 2005

(51) Int. Cl.⁷ ................................................ F03D 7/00
(52) U.S. Cl. ............................ 290/55; 290/54; 290/53; 290/44; 290/1 R; 290/42; 415/2; 415/3; 415/4
(58) Field of Search ............................ 290/55, 43, 1 R, 290/42, 44, 54; 415/2, 4, 3

(56) References Cited

U.S. PATENT DOCUMENTS

| | | | |
|---|---|---|---|
| 4,047,834 A | * | 9/1977 | Magoveny et al. ........ 415/53.1 |
| 4,116,581 A | | 9/1978 | Bolie |
| 4,236,083 A | | 11/1980 | Kenney |
| 4,415,311 A | | 11/1983 | Grana et al. |
| 4,421,967 A | | 12/1983 | Birgel et al. |
| 4,551,631 A | * | 11/1985 | Trigilio ........................ 290/55 |
| 4,822,239 A | | 4/1989 | Tsipov |
| 4,857,753 A | * | 8/1989 | Mewburn-Crook et al. ... 290/55 |
| 4,926,061 A | | 5/1990 | Arreola |
| 5,126,584 A | * | 6/1992 | Ouellet ........................ 290/55 |
| 5,163,813 A | | 11/1992 | Schlenker |
| 5,332,925 A | | 7/1994 | Thomas |
| 5,570,997 A | | 11/1996 | Pratt |
| 6,666,650 B1 | * | 12/2003 | Themel .................. 416/200 R |

* cited by examiner

Primary Examiner—Nicholas Ponomarenko
Assistant Examiner—Iraj A. Mohandesi
(74) Attorney, Agent, or Firm—McFadden, Fincham

(57) ABSTRACT

This invention relates to a horizontal omni-directional windmill comprising a rotor including an upper platform and a lower platform, a plurality of identically configured blades, wherein each of the blades is of a substantially aerodynamic configuration, each of the blades being oriented at a broad angle relative to the radius of the rotor, the blades being oriented in a generally vertical orientation relative to the upper and lower platforms.

16 Claims, 5 Drawing Sheets

$\frac{1}{3} = 20°$
$\frac{1}{2} = 30°$
$\frac{2}{3} = 40°$

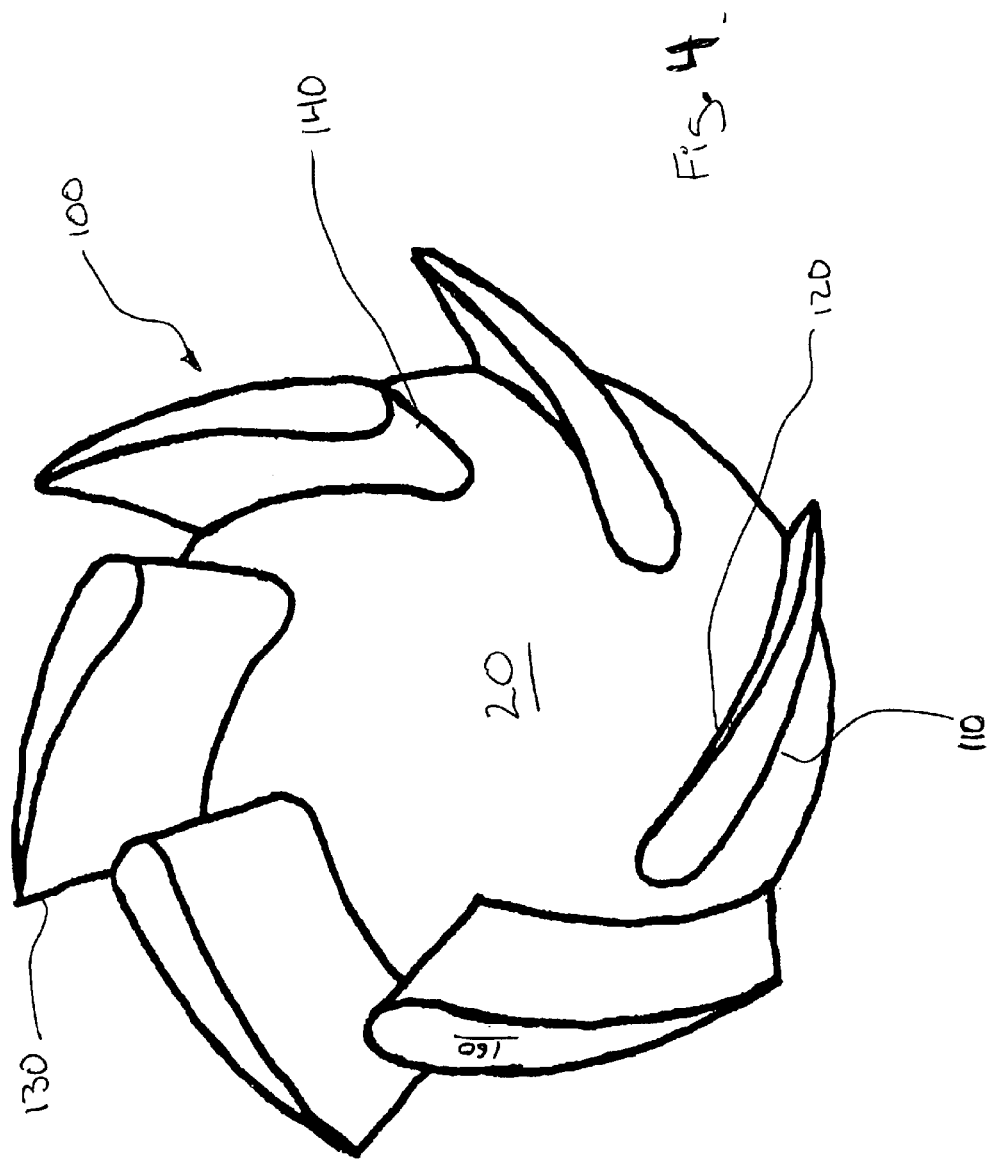

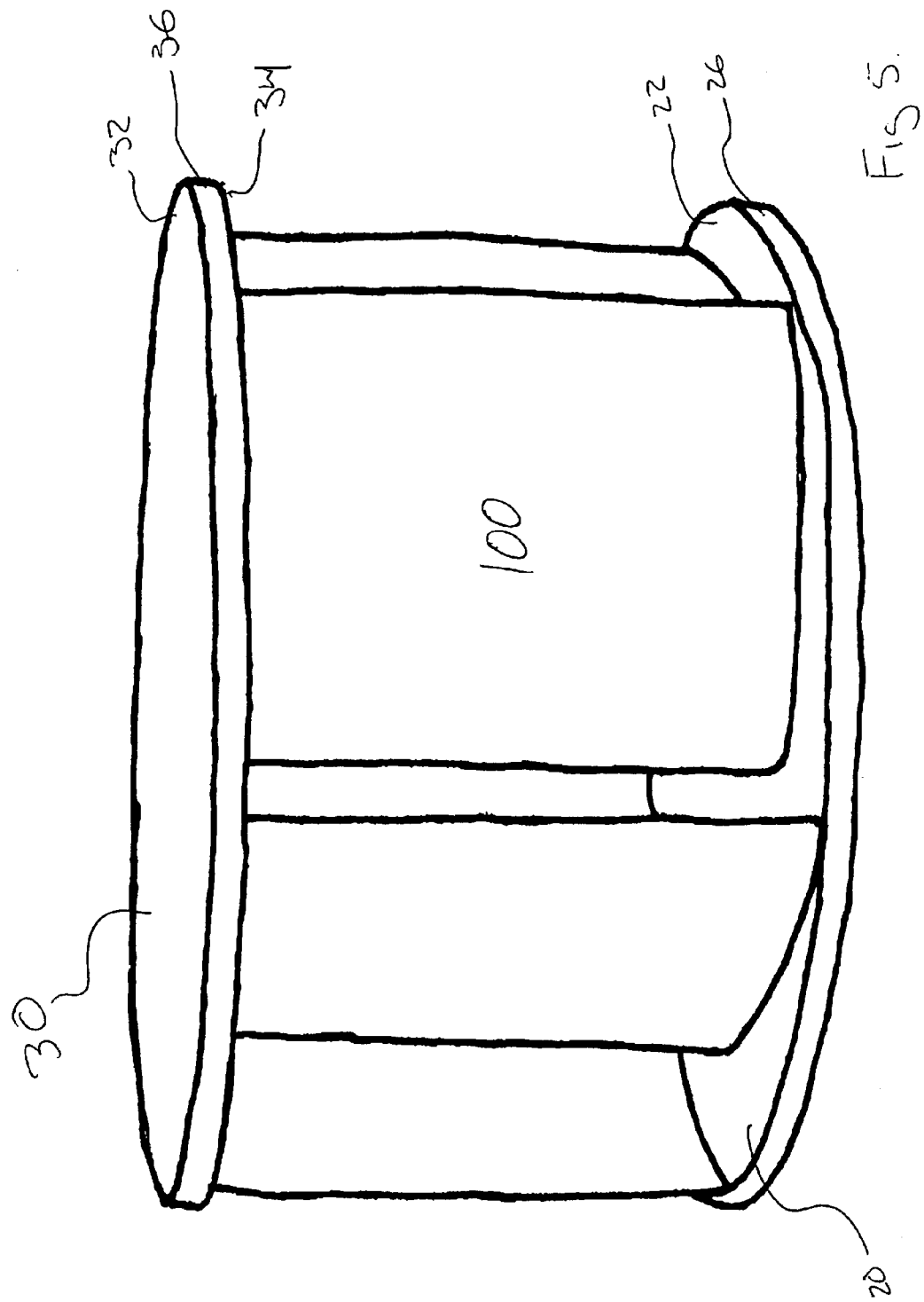

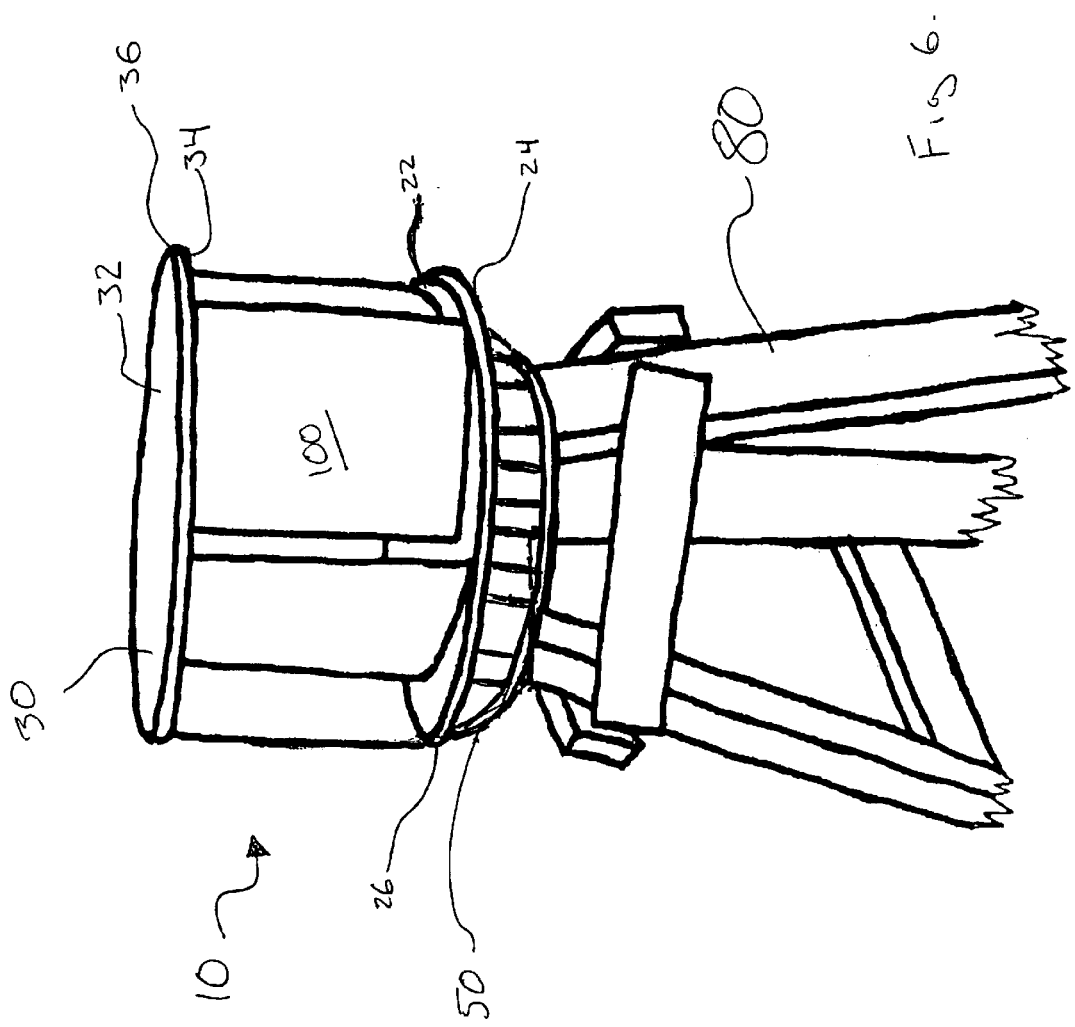

HORIZONTAL OMNI-DIRECTIONAL WINDMILL

FIELD OF INVENTION

This invention relates to horizontally rotating windmills of the type in which a rotor is mounted on a vertical axle and drive shaft, and in which vertically disposed vanes are positioned so as to conduct airflow through the rotor.

BACKGROUND OF THE INVENTION

Windmills and wind turbines are well known in the art. Windmills traditionally include a plurality of blades or vanes connected to a rotatable shaft. Wind (or other fluids) act upon the blades to create an aerodynamic or hydrodynamic reaction upon the blades causing the shaft and blades to rotate about the axis of the shaft. Windmills have traditionally been employed across the world to perform functions from pumping of water, grinding grains and with respect to changing kinetic energy to electrical energy, being coupled to other devices for generating and transmitting electrical power. In recent times, due to rising energy costs and awareness of the need for alternative energy sources, interest has greatly increased in devices adapted to capture the power of the wind.

Examples of the prior art include U.S. Pat. No. 5,126,584 to Ouellet, U.S. Pat. No. 4,926,061 to Arreola and U.S. Pat. No. 4,047,834 to Magoveny et al. U.S. Pat. No. 5,126,584 illustrates a windmill including moveable vanes, the vanes being formed of an outer stationary shutter and an inner moveable shutter. U.S. Pat. No. 4,926,061 illustrates a wind trap energy system, each wind trap having a pair of vanes 60 degrees apart from the other for interception of wind kinetic energy from any direction. U.S. Pat. No. 4,047,834 to Mogaveny et al., discloses a windmill having fixed vanes on an outer perimeter of a fixed base member and a plurality of fixed buckets mounted to a rotor mounted on an axle.

While these references generally disclose windmills of the type contemplated by the present invention, these references do not teach the geometry of the curved, adjustable blades having a wing shaped configuration of the present invention.

Accordingly, there is a need for a relatively simple, inexpensive windmill with vertically oriented blades capable of being positioned at various angles.

SUMMARY OF THE INVENTION

According to one aspect of the present invention, there is provided a horizontal omni-directional windmill comprising a rotor including an upper platform and a lower platform, a plurality of variable angle identically configured blades, wherein each of the blades is of a substantially aerodynamic configuration, each of the blades being oriented at a broad angle relative to the radius of the rotor, the blades being oriented in a generally vertical orientation relative to the upper and lower platforms.

According to a further aspect of the present invention, the horizontal omni-directional windmill is rotatable about its vertical axis, and also includes means for coupling the rotor to a power generator, the means including a power transfer shaft.

According to another aspect of the present invention, the horizontal omni-directional windmill includes blades having an angular orientation selected between about 20° and about 50°, between about 35° and about 45°, and desirably about 40°.

BRIEF DESCRIPTION OF THE DRAWINGS

FIG. 4 is a top view of the lower platform including 6 profile blades positioned at approximately 40 degrees and their relative position to each other;

FIG. 5 is an elevational side view of the windmill including the upper platform, and FIG. 6 is a side view of the present invention mounted on a support member.

DETAILED DESCRIPTION OF THE PREFERRED EMBODIMENTS

Figure 2:
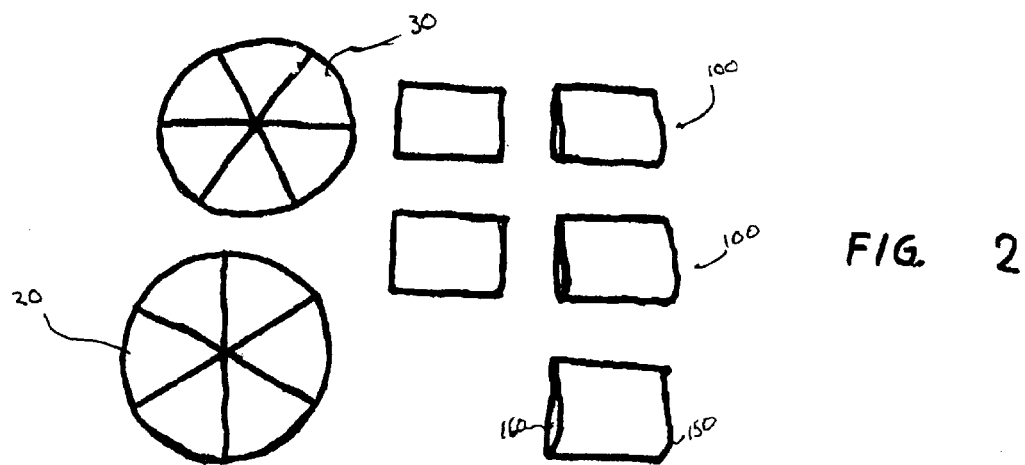
FIG. 2 is an exploded view of some of the parts being removed for simplicity of the illustrations.

With reference to the drawing figures, there is illustrated a preferred form of a rotatable windmill or wind turbine depicted generally by reference numeral 10. The windmill or wind turbine as illustrated includes a rotatable housing or rotor 10, defined by spaced apart lower and upper discs or platforms 20 and 30 respectively, blade or vane mounting means 40, rotatable axle means 50, and a plurality of variable angle, aerodynamic vanes or profile blades 100. FIG. 2 illustrates a disassembled view of the windmill 10, including upper and lower platforms 20 and 30 and vanes 100.

As illustrated in FIGS. 1 to 6, and more particularly in FIGS. 5 and 6, a rotatable housing or rotor 10 includes lower and upper horizontally-disposed discs or platforms (20, 30) connected by the plurality of variable angle profile blades 100. The lower platform 20 has a substantially circular configuration, including a substantially planar or flat upper and lower surfaces 22 and 24, and a peripheral edge 26. The lower platform acts as a base for the rotor 10. The upper platform or member 30 has a substantially planar or flat upper surface 32 and a planar or flat lower surface 34 with a peripheral edge 36.

Figure 3:
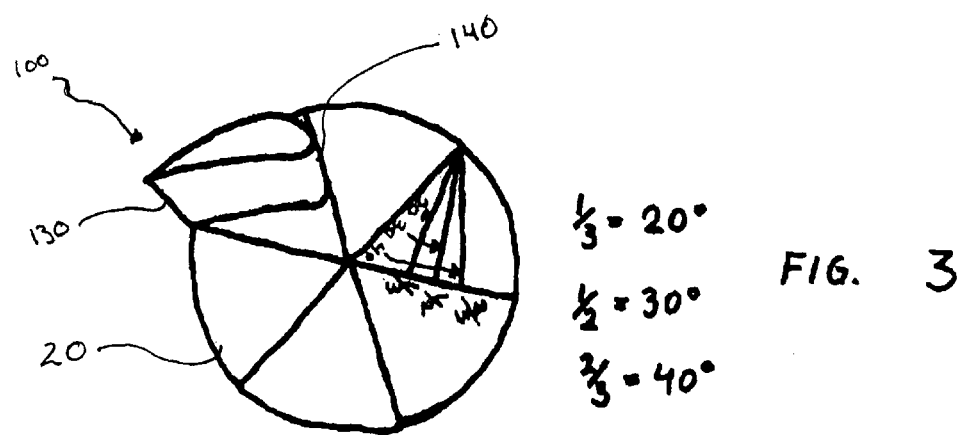
FIG. 3 is a top view of the lower platform including a profile blade thereon positioned at approximately 40 degrees to the radius.

A illustrated in FIGS. 3 and 5, the blades 100 may be set to a desired angle (ie., 20 through 50 degrees) and secured in place between the upper and lower platforms 20, 30 through suitable means. The upper and lower platforms alternatively may have suitable indentations or other detent means to secure or lock the profile blades 100 in place. Alternatively, the profile blades may include suitable mounting means in which the blades may be adjusted after they have been secured in place between the upper and lower platforms.

In use, the rotor or rotatable housing 10 is free to rotate about its longitudinal axis when acted upon by the wind. While any suitable frame or structural support means may be employed, a supporting structure shown generally in FIG. 6 as reference numeral 80 is described herein for example purposes only. As illustrated, the lower platform 20 is supported on a collar (50) which is rotatably connected to a power transfer shaft or axle member. In turn, the axle or shaft member 60 is adapted for connection through suitable means to a generator or the like. This rotation is used to drive or power an alternator or generator to produce electricity, which can be used or stored. The generator may be electric, pneumatic, hydraulic or other suitable generator or other mechanism for generating power in transmittable form, for example electricity, or for storage of the generated power. While a collar 50 is illustrated, this support may be replaced by other suitable connections or supports known in the art.

The profile blades 100 are adapted to "funnel and focus" wind flow through the assembly of the blades 100 and the upper and lower discs 20 and 30. As noted above, and as illustrated in FIG. 4, the blades 100 are generally wing-shaped in section, i.e., with a slight concave "inner" face and an outer face having a more pronounced curvature. The blade angle variability may be effected manually, although other methods of varying the angle of the blades 100 may be used. The blades 100 are preferably angled such that the relative arrangement of the blades funnel and focus the wind flow by creating a venturi effect as wind passes through the rotatable housing or rotor 10. The variable angle of the blades 100 and the means for setting the angle are discussed in greater detail below.

In a preferred embodiment the blades 100, as described above and as illustrated in FIGS. 1 and 3, have a generally elongated or aerofoil or wing shaped configuration, including an inner face 120 and an outer face 110. Each blade 100 is similar in profile or configuration, for example, to that of an aerodynamic aeroplane wing. The inner face 120 of each blade 100 has a slight "concave" shape, and an outer face 110 which has a slight "convex" configuration. Each blade 100 has a front or leading edge 130, and a rear or trailing edge 140. The blades 100 are positioned in a substantially vertical orientation with respect to the horizontally oriented upper and lower platforms (20, 30) and are spaced equidistance from each other between the lower and upper platforms (20, 30) about a common inner circle. The rear or trailing edge of the profile blade terminates inwardly at a distance from the centre of the housing, leaving a central space or common inner circle through which the wind/air can flow after being "funnelled" or directed via the blades 100.

Figure 1:
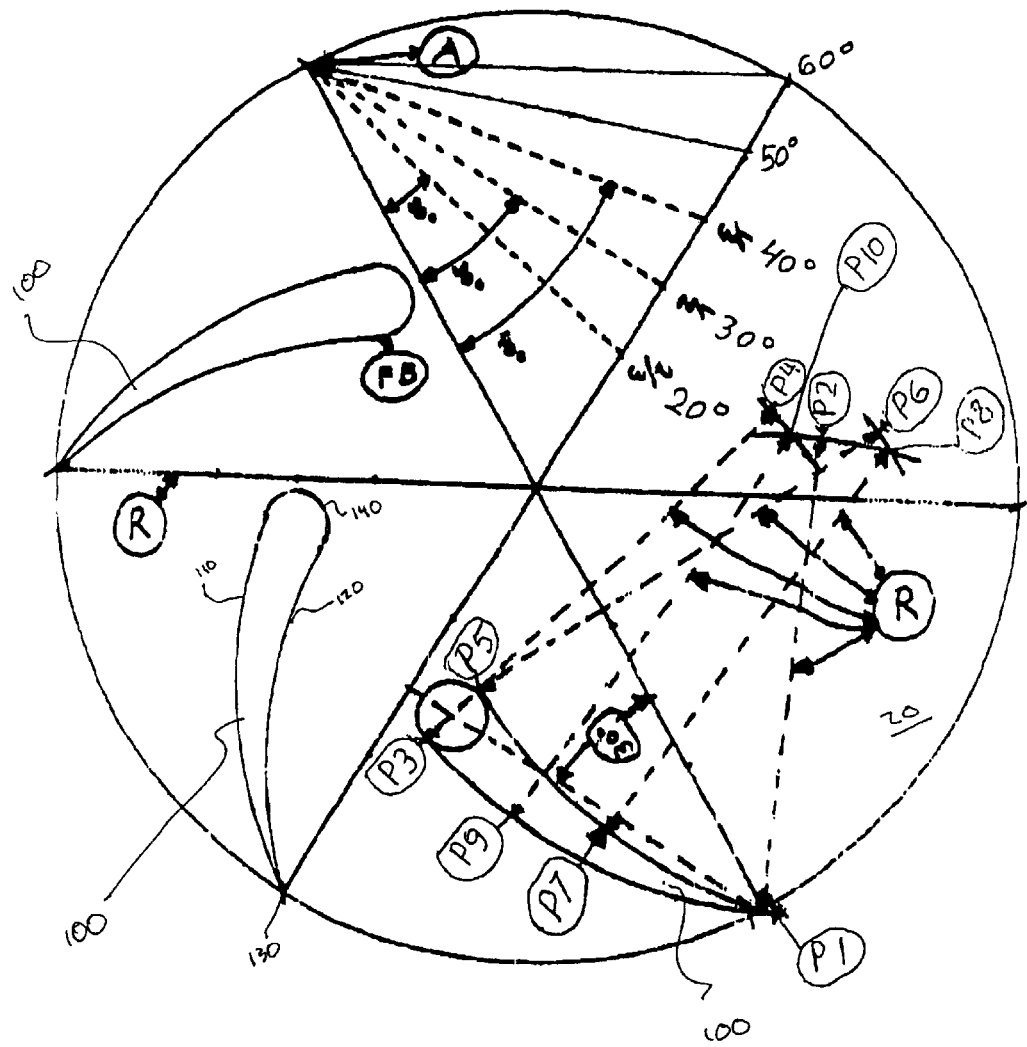
FIG. 1 is an elevational view of the windmill of a first preferred embodiment illustrating the various angles and radii aspects of the present invention.

Each blade or vane 100 includes a front portion or leading edge 130, which as shown in FIG. 1, is mounted facing the exterior or peripheral edge of the housing 10, facing the wind. As illustrated, the front or leading edge 130 is sharp, and the rear or trailing edge 140 is of a generally rounded configuration. With respect to the vertical orientation of each blade 100 (between the upper 20 and lower 30 horizontal platforms), each blade 100 includes a lower and upper side 150 and 160. The lowermost side 150 is adapted to be secured or otherwise positioned onto the lower or bottom disk 20, while the upper portion or side 160 is adapted to support or receive the upper platform 30. The position of the profile blade 100 is such that the sharp edge of the blade is adapted to catch the wind. It should be noted that each blade 100, in comparison to a normal working position or orientation of an aeroplane wing, is reversed in both lateral and longitudinal orientations with the leading or sharp edge 130 catching or facing the wind.

As illustrated in the FIG. 4, six profile blades are employed, however it should be noted that the number and angle of the blades can vary, and should not be limited to six. The number of blades can vary, for example based upon expected intensity of the wind. This variability in the number of blades used helps configure the windmill for optimal performance based on the determined prevailing wind characteristics of a particular location. Preferably, the profile blades 100 are of a predetermined height and length corresponding to dimensions of the discs or platforms (20, 30).

As illustrated in FIG. 1, each profile blade 100 is positioned between the lower and upper platforms (20, 30) such that the angle of each blade 100 is variable between approximately 20° to 50° with respect to the radius of the upper and lower platforms. Blades 100 are shown positioned on the lower platform 20. The lower platform 20 is illustrated as having/being divided about its axis. Reference character "A" is illustrative of the angle between the blade 100 and the radius or circumference, referenced by the character "R". As illustrated, the rear or trailing edge 130 is generally rounded. As illustrated in FIG. 1, the representation of the blade 100 is represented by the front of the blade labelled FB. When viewed from a top or elevational perspective, the bottom disk turns in a clockwise direction. It moves like an air-plane wing—whereby the end of the blade catches the wind. As understood by those skilled in the art, the number of blades will vary, for example such as depending on the intended use, area, wind conditions, etc.

The profile, labelled as reference character R, represents lengths of radius between: 1–2, 3–4, 5–6, 7–8, 9–10; P=point (10 times), P2 crossing P6 makes P8 and produces inner curve as radius lengths is applied. P2 crossing P4 makes P10 and produces outer curve as radius lengths is applied. Reference character "FB" generally represents the rear-ward or trailing edge 140. As illustrated, the range in variance of the angle is between 20° to 50°, preferably between 25° and 45° and most desirably approximately 40° with respect to the radius of the disk(s).

As illustrated in FIG. 1, the angles 20°, 30° and 40° correspond to with markings of one-third, (⅓), one half (½) and two-thirds (⅔) of the platform.

The variable angle of the blades 100 may be effected either through manual means such as positioning the blades 100 at the desired angle prior to completing the assembly of the windmill, or other suitable mechanical means which allow for the movement or placement of the blades to a desired angle. As illustrated in FIGS. 1 and 3A, each profile blade 100 is mounted in a vertical orientation with respect to the horizontally disposed upper and lower platforms (20, 30) and is positioned at an angle which is adjustable between approximately 20° and 50°. The adjustment of the angle of the blades 100 may be effected prior to the securement of the upper platform 20. For example, suitable markings such as incremental degrees or other indicia may be present on one or both disks (20, 30) in order to properly align the blades within the correct angle, after which the blades 100 are secured to the upper and lower platforms (20,30).

In another embodiment, each blade 100 may be fixed or secured proximate the leading edge 130 of the blade 100, and the rearward edge 140 (inner portion) of the blade 100 such that at least a portion of the blade is moveable between the desired angles. This movement may be effected through suitable means, such as pins and pin receiving apertures or other conventional means which provides for moving and securing each blade 100 between the lower and upper disks or platforms (20, 30). Alternatively, other mechanical means are within the scope of the present invention, which would allow a user to set the angular orientation of the profile blades 100 with respect to the radius of the disks, either individually or all at once. This may be effected either prior to or after placement of the blades between the upper and lower platforms. Alternatively, it is within the scope of the present invention to have a variable angle blade which is adapted to be set and adjusted by an end user.

As noted above, the dimensions of the blades 100 correspond to that of the rotatable housing 10. In general terms, the height to diameter ratio of the windmill will determine torque versus speed ratio. This ratio permits the windmill to be coupled to various mechanisms, for example generators. In a preferred embodiment, lengths of the blade are about 10% less than the radius lengths and height of the blade are about 10% more than the radius lengths. The front blade diameter is approximately 1/7 of the radius lengths.

As noted above, the profile blades 100 are arranged on the platforms (20,30) and are adjustable from approximately from 20° to 50°. In a preferred embodiment, the circumference of the blades 100 is the same as the circumference of the platform (20,30). Desirably, the length of the radius of the disc or platform (20 or 30) is also equal the height of the blade 100. This relationship can vary for ornamental or other reasons.

Alternatively, the present invention may also include an embodiment in which the angle of the blade towards the radius is changeable. Suitable blade mounting means 40 are provided to releasably secure the variable blades 100 to the upper and lower platforms 20 and 30. Mounting means such as—removeable fasteners, handles or other angle control mechanisms may be used to set the blades 100 to the desired angle. In a preferred embodiment, the blades 100 are secured on at least one of the peripheral edges 26, 36 through suitable means.

In use, the angle of the variable blades 100 may be preset, depending on various factors such as location, anticipated use etc., and arranged on the lower disc member 20 according the desired angle. The upper platform is then secured to the profile blades 100, after which the assembled structure 10 is placed onto a suitable frame or structure, dependent on the anticipated use, (ground installation, tower, roof etc.). Once the windmill or wind-turbine is in place (ie ground installation, tower, building etc.,) the rotatable housing 10 is able to rotate based on the wind direction.

FIG. 6 is a side view of the present invention mounted to a suitable structure to raise the horizontal windmill above a surface. Alternatively, the windmill 10 may also be positioned at a higher elevation, such as on a tower, the roof of a commercial, residential or agricultural building or other edifice or structure.

Although embodiments of the invention have been described above, it is not limited thereto and it will be apparent to those skilled in the art that numerous modifications form part of the present invention insofar as they do not depart from the spirit, nature and scope of the claimed and described invention.

What is claimed is:

1. A horizontal omni-directional windmill comprising:
   a rotor including an upper platform and a lower platform,
   a plurality of identically configured blades, wherein each of said blades is of a substantially aerodynamic configuration, each of said blades being oriented at a broad angle relative to the radius of said rotor, said blades being oriented in a generally vertical orientation relative to said upper and lower platforms, wherein said windmill includes a control mechanism for varying the angular orientation of the variable angle blades relative to the radius of said rotor.

2. A horizontal omni-directional windmill according to claim 1, wherein said windmill is rotatable about its vertical axis.

3. A horizontal omni-directional windmill according to claim 1, wherein said windmill further includes means for coupling said rotor to a power generator.

4. A horizontal omni-directional windmill according to claim 2, wherein said means for coupling is a power transfer shaft.

5. A horizontal omni-directional windmill according to claim 1, wherein the angle of the blades is variable.

6. A horizontal omni-directional windmill according to claim 5, wherein said angular orientation of said variable angle blades is selected between about 20° and about 50°.

7. A horizontal omni-directional windmill according to claim 5, wherein said angle is selected between about 35° and about 45°.

8. A horizontal omni-directional windmill according to claim 5, wherein said angle is about 40°.

9. A horizontal omni-directional windmill comprising:
   a rotor including an upper platform and a lower platform,
   a plurality of variable angle identically configured blades, wherein each of said blades is of a substantially aerodynamic configuration, each of said blades being oriented at a broad angle relative to the radius of said rotor, said blades being oriented in a generally vertical orientation relative to said upper and lower platforms, wherein said windmill includes a control mechanism for varying the angular orientation of the variable angle blades relative to the radius of said rotor.

10. A horizontal omni-directional windmill according to claim 9, further including means for adjusting the angle of said variable angle blades.

11. A horizontal omni-directional windmill according to claim 9, wherein said windmill is rotatable about its vertical axis.

12. A horizontal omni-directional windmill according to claim 9, wherein said windmill further includes means for coupling said rotor to a power generator.

13. A horizontal omni-directional windmill according to claim 9, wherein said means for coupling is a power transfer shaft.

14. A horizontal omni-directional windmill according to claim 9, wherein said angular orientation of said variable angle blades is selected between about 20° and about 50°.

15. A horizontal omni-directional windmill according to claim 9, wherein said angle is selected between about 35° and about 45°.

16. A horizontal omni-directional windmill according to claim 9, wherein said angle is about 40°.

* * * * *